Sept. 7, 1926.
T. C. LEAKE
1,598,778
TRACK ROLLER FOR TRACTORS
Filed May 22, 1923   2 Sheets-Sheet 2
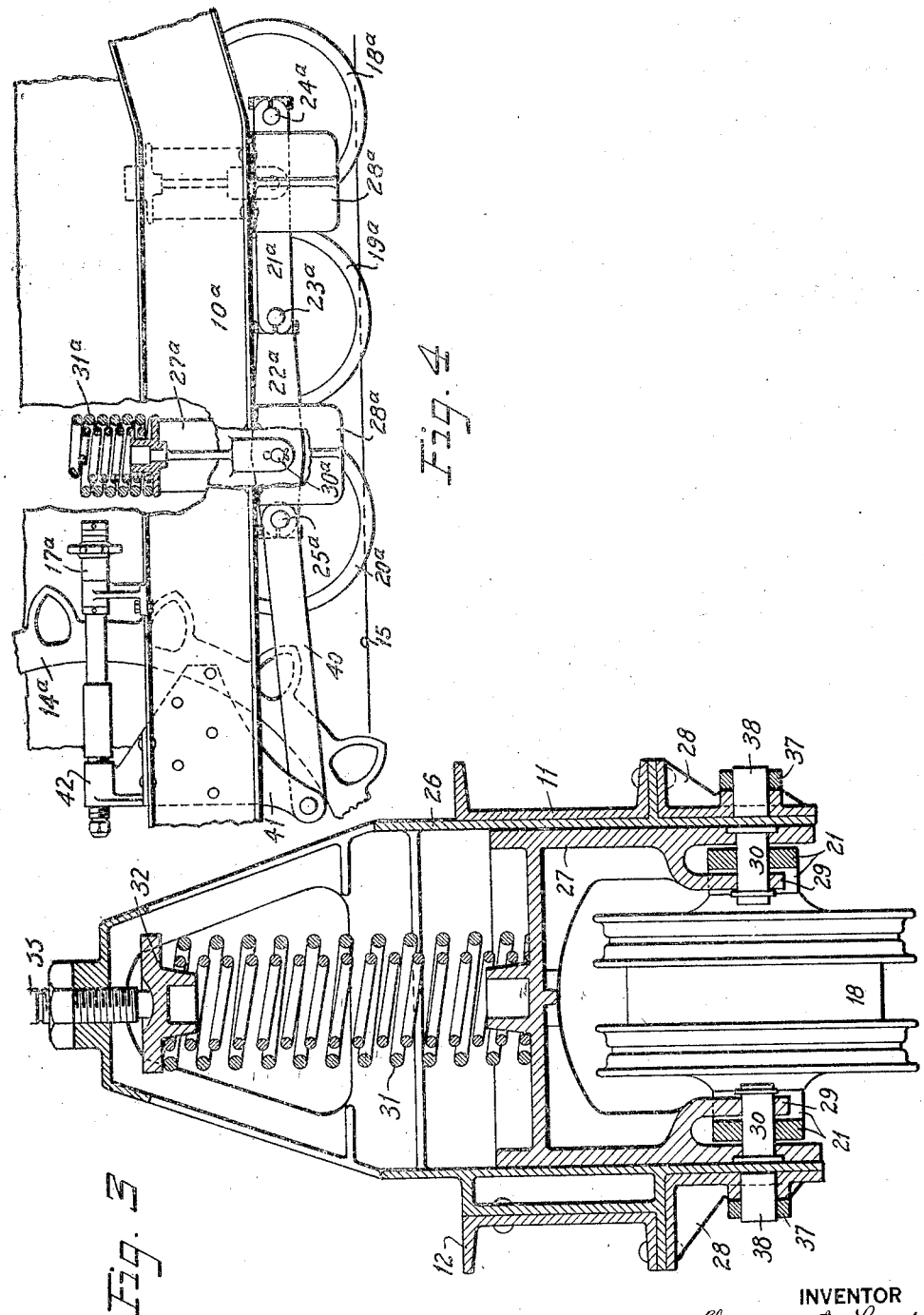
INVENTOR
Thomas C. Leake
BY
Duell, Warfield & Duell
ATTORNEY Patented Sept. 7, 1926.

1,598,778

UNITED STATES PATENT OFFICE.

THOMAS C. LEAKE, OF NEW YORK, N. Y., ASSIGNOR TO BEAR TRACTOR CORPORATION OF AMERICA, OF NEW YORK, N. Y., A CORPORATION OF DELAWARE.

TRACK ROLLER FOR TRACTORS.

Application filed May 22, 1923. Serial No. 640,662.

This invention relates to tractors, and more especially in some of its details to features of construction thereof relating to track rollers for supporting the flexible traction tread.

It is a general object of the invention to provide an improved support for the flexible traction element of tractors or the like, whereby that element is held in contact with the ground, and to maintain effectively its traction and supporting engagement therewith over rough or irregular surfaces.

A further object of the invention is the provision of an improved articulated roller construction for supporting flexible traction elements of tractors or the like, so as to effectively equalize and distribute the loads transmitted thereto.

Still another object is to provide a simple and reliable equalizing track supporting roller construction for tractors or the like, with an improved mechanism for absorbing thrusts and stresses incident to use.

Other objects will be in part obvious in connection with the following detailed description of illustrative embodiments of the invention, and will be in part pointed out in connection therewith.

The invention accordingly comprises the features of construction, combinations of elements, and arrangement of parts, which will be exemplified in the construction hereinafter set forth and the scope of the application of which will be indicated in the claims.

For a complete understanding of the nature and objects of the invention, reference is had to the following detailed description, and to the accompanying drawings in which—

Fig. 3 is an enlarged sectional view taken approximately on the line 3—3 of Fig. 2, looking in the direction of the arrow, and Fig. 4 is a side elevation corresponding to Fig. 2, but showing a modified form of the invention.

Figure 1:
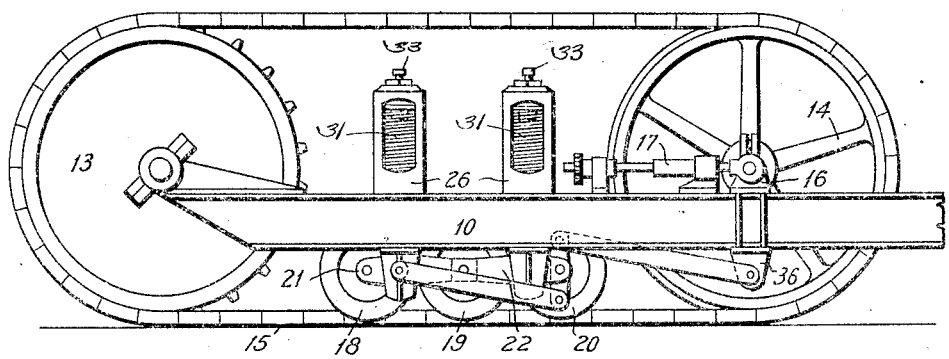
Fig. 1 is a side elevation of a tractor construction embodying the invention.
Figure 2:
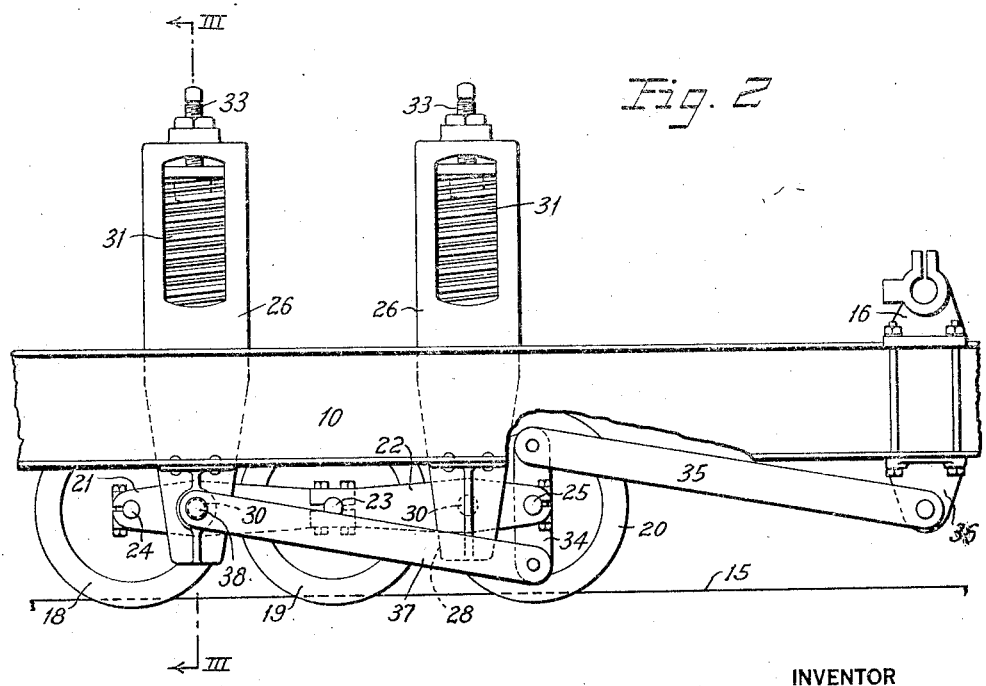
Fig. 2 is an enlarged fragmentary elevation of the track roller construction.

Referring to the accompanying drawings for a detailed description of the embodiments of the invention there shown, and first to the modification shown in Figs. 1 to 3 inclusive, a tractor of the flexible tread type is shown in a somewhat fragmentary manner, only enough of the general construction of the tractor being shown to make clear the application and operation of the improvements. A side or track frame of the tractor is indicated at 10, having inner and outer spaced frame members or sills 11 and 12, and track supporting sprockets 13 and 14 are spaced therealong. Power is ordinarily supplied to the flexible tread or track 15 through the rear or driving sprocket 13, and the front or idler sprocket 14 is preferably mounted on the tractor frame 10 and carries the front part of the flexible traction element around which the latter extends. A bearing carried by an adjustable bracket 16 is employed for supporting the idler sprocket and an adjusting mechanism 17 mounted on the track frame 10 is preferably employed for convenient adjustment of the idler sprocket to vary the tension of the flexible traction tread.

For supporting the reach of the flexible tread between front and rear sprockets, a track supporting roller construction is provided, which in the embodiment shown includes a series of three track engaging rollers 18, 19 and 20 adapted for engagement with the inner face of the track links, or with suitable rails carried thereby. The rollers are rotatably mounted on equalizing or compensating bars or levers 21 and 22 which are preferably arranged in forward and rearward pairs and between which the rollers are positioned. The forward and rearward equalizing levers are pivoted together at their adjacent ends as at 23 preferably coincident with the axis and forming the spindle of the intermediate roller 19, while the rollers 18 and 20 are connected respectively at far ends of the equalizing bars 21 and 22 as by spindles 24 and 25. It will be understood that a greater or less number of rollers may be employed dependent upon length of track span to be supported, operating conditions and other factors.

Each of the equalizing levers 21 and 22 is yieldably connected to the track frame of the tractor by a spring box arrangement, which is substantially the same for both levers, and a detailed description of one will therefore suffice for both. As shown in Figs. 2 and 3 the spring box construction includes a housing 26, preferably of cast metal disposed between and connected to the frame members 11 and 12. The opposed lateral walls of the housing 26 are provided with smooth inner contact surfaces for receiving therebetween a spring block or casting 27 which is mounted for up and down movement between the sills 11 and 12. The walls of the housing 26 are preferably arranged to extend below the sills 11 and 12, forming lateral guides for the up and down movement of the spring block 27, and being reenforced by exterior brackets 28 riveted to the tractor frame. At opposite lateral sides the spring block 27 is provided with lugs 29, spaced inwardly from the walls and adapted for the attachment of the equalizing bars 21 or 22. As shown in Fig. 3, each equalizing bar is pivoted intermediate its ends to the spring block by means of pins 30 extending through the walls of the box and into the adjusting lugs 29. For yieldingly supporting the spring block 27 for up and down movement relative to the tractor frame, a spring 31 is interposed between the spring block and the upper spring plate 32, forming a seat for the spring and being adjustable by means of a screw 33 mounted in the housing 26. As shown, a plurality of concentric spiral springs are preferably provided for this purpose, the tension being adjusted by means of the adjusting screw 33 in accordance with the requirements of the service in which the tractor is employed.

It will be understood that undue lateral movement of the track rollers transversely of the tractor will be prevented by engagment of the spring blocks 27 with the adjacent walls of the housing 26, but longitudinal movement thereof is resisted by means of a construction which will now be described.

Connected to an end of the equalizing links, such as to the link 22 as shown in Fig. 2, is a cross link 34. Link 34 is connected intermediate its ends, preferably coincidentally with the pivot pin 25, and at the upper end thereof a link or radius rod 35 is pivoted. At its forward end the radius rod 35 is pivoted to a bracket 36 secured to the tractor frame 10 in any desired manner. To the lower end of the cross link 34 a second or rearwardly extending radius rod is pivoted, the rear end of this rod being pivoted as at 38 to the downwardly extending bracket 28. It will be understood that this radius rod construction which is adapted to take up the longitudinal thrust upon the track rollers may be duplicated at opposite sides of the track rollers as shown in the drawing, or it may be omitted either at the inner or outer side of the rollers.

In operation by means of the construction above described, it will be seen that upward thrusts upon any one of the track rollers, not only will be transmitted to the tractor frame through the spring connections described, but such thrusts will also be transmitted through the respective equalizing bars to the adjacent rollers and through the rollers to or from the flexible traction tread. The connections of the rollers to the equalizing bars and the connections of the bars to the spring blocks are so spaced relatively to each other and inter-arranged that the flexible tread is effectively supported in engagement with the ground and good tractive contact is thus maintained even over very rough and irregular surfaces. Also wear and strain on the track links and upon the roller construction itself are reduced due to the resilient connection of the rollers to the tractor frame and particularly because of the equalizing connections of the rollers whereby the stresses and loads transmitted therethrough are equalized and distributed over a large part of the stretch of tread extending between the main supporting sprockets. The relative arrangement and spacing of the roller bearings and equalizer bar supports as illustrated in the drawing, that is, with the equalizer bars fulcrumed as at 30 at about one-third of the distances from the outer ends thereof, is found effective for proper distribution of the load stresses. Side thrusts upon the rollers as before stated, are taken up by the lateral walls of the housing 26, but longitudinal thrusts thereon will be effectively absorbed by the radius links or rods 35 and 37. This arrangement permits free upward and downward movement of the rollers without binding, thus reducing wear on the parts, but undue longitudinal movement of the track roller construction will be provided by operation of these radius rods. It will be seen that the cross link 34 connected as described functions as an equalizer for articulating the radius rods 35 and 37 with the equalizing bar 22 so as to equalize transmitted thrusts and to compensate for up and down movement of said equalizing bar 22.

In the modification of Fig. 4, the general assembly and arrangement of parts are similar to that disclosed in the modification previously described and the corresponding parts are designated by similar reference numerals with the index $a$. The front or idler sprocket is indicated at $14^a$ and the three rollers at $18^a$, $19^a$ and $20^a$ respectively, the latter being interconnected as before by the equalizer bars $21^a$ and $22^a$ which are resiliently supported intermediate their ends upon the tractor frame through the spring blocks $27^a$.

In this modification however, each of the radius rods as indicated at 40 is pivoted directly to the forward end of the corresponding forward equalizing bar $22^a$, preferably coincident with the axis $25^a$ of the forward track roller $20^a$. The forward end of this equalizer bar is pivoted to a bracket 41, preferably an integral casting riveted to the tractor frame 10ª. This bracket 41 preferably extends above the upper surfaces of the frame forming a bearing 42 for the forward end of the adjusting mechanism 17ª for the idler sprocket. As in the modification previously described, it will be understood that the equalizing bars may be arranged in pairs disposed on opposite sides of the track rollers, and the radius rods are preferably arranged in corresponding pairs connected to the forward ends of the forward equalizing bars 22ª.

The operation of this form of the invention is similar to that above described, and will be obvious without reiteration. The construction in this case, however, is somewhat simpler and the number of parts reduced resulting in advantages from manufacturing and operating standpoints.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:—

1. In a tractor, in combination, a frame for the tractor, wheels mounted on said frame, an endless flexible traction tread carried by said wheels, a plurality of track rollers for supporting a reach of said tread intermediate said wheels, articulated equalizing bars upon which said rollers are rotatably mounted in spaced relation, one of said rollers being mounted at the articulation point of said equalizing bars, means for pivotally mounting said equalizing bars intermediate their ends on the tractor frame, and a rod operatively connected to one of said equalizing bars adjacent the end thereof remote from said articulation point and anchored to the tractor frame to absorb end thrusts upon said rollers.

2. In a tractor, in combination, a frame for the tractor, wheels mounted on said frame, an endless flexible traction tread mounted upon said wheels, a plurality of track rollers for supporting a reach of said tread intermediate said wheels, articulated equalizing bars upon which said rollers are rotatably mounted, spaced supporting blocks yieldingly carried by the tractor frame to each of which one of said equalizing bars is connected for pivotal movement and a radius rod operatively connected to one of said equalizing bars and anchored to the tractor frame to absorb end thrusts upon said rollers.

3. In a tractor in combination, a frame for the tractor, wheels mounted upon said frame, an endless flexible traction tread mounted upon said wheels, a plurality of track rollers adapted to engage and support a reach of said tread, equalizing bars articulated with each other and upon which said rollers are mounted substantially in longitudinal alignment, supports for supporting said bars on said frame and including pivotal connections positioned intermediate the ends of each of a plurality of said equalizing bars, and a radius rod operatively connected to one of said equalizing bars and anchored to the track frame so as to absorb longitudinal thrusts on said rollers or equalizing bars.

4. In a tractor, in combination, a frame for the tractor, wheels mounted upon said frame, an endless flexible traction tread mounted upon said wheels, a plurality of track rollers adapted to engage a reach of said tread, equalizing bars interconnecting said rollers, spaced supporting blocks yieldingly carried by the tractor frame to each of which one of said equalizing bars is connected for pivotal movement, brackets carried by the said frame for limiting said equalizing bars and rollers from excessive movement laterally of said flexible tread but permitting free movement thereof longitudinally of said tread, and a radius rod operatively connected to one of said equalizing bars and anchored to the tractor frame.

5. In a tractor, in combination, wheels mounted upon the tractor, an endless traction tread mounted upon said wheels, a plurality of track rollers for supporting a reach of said tread intermediate said wheels, equalizing bars yieldingly supported intermediate their ends on the tractor and pivotally connected together at their adjacent ends, said rollers being rotatably mounted in spaced relation upon said equalizing bars and one of said rollers being mounted at the pivotal connection between said bars, brackets carried by said tractor for confining said equalizing bars and rollers from excessive movement laterally of said flexible tread but permitting free movement thereof longitudinally of said tread, and a radius rod operatively connected to one of said equalizing bars adjacent the end thereof remote from said pivotal connection and anchored to the tractor frame.

6. In a tractor in combination, wheels mounted upon the tractor, an endless flexible traction tread mounted upon said wheels, a plurality of track rollers adapted to engage and support a reach of said tread, equalizing bars interconnecting said rollers, a link connected intermediate its ends to one of said equalizing links and extending transversely thereof, and radius rods connected to said last mentioned link on opposite sides of its connection with said equalizing bar, and anchored to said tractor frame.

7. In a tractor in combination, a frame for the tractor, wheels mounted upon said frame, an endless flexible traction tread mounted upon said wheels, a plurality of rollers adapted to engage and support a reach of said tread, equalizing bars interconnecting said rollers and being connected in pairs thereto, movable supporting members yieldingly carried by said frame to each of which a pair of said equalizing bars is connected for pivotal movement at spaced parts thereof and intermediate the ends of the links, guides carried by the frame for guiding movement of said rollers in a vertical plane but permitting longitudinal movement thereof, and a radius rod operatively attached to one of said equalizing bars and anchored to the frame.

8. In a tractor in combination, a frame for the tractor, wheels mounted upon said frame, an endless flexible traction tread mounted upon said wheels, a plurality of track rollers adapted to engage and support a reach of said tread, equalizing bars articulated with each other and upon which said rollers are mounted substantially in longitudinal alignment, supports for supporting said bars on said frame and including pivotal connections positioned intermediate the ends of each of a plurality of said equalizing bars, and a plurality of longitudinal thrust absorbing radius rods having an equalizing connection with one of said equalizing bars and anchored to the track frame at points spaced longitudinally therealong.

THOMAS C. LEAKE.